United States Patent
Frank et al.

(10) Patent No.: US 6,286,092 B1
(45) Date of Patent: Sep. 4, 2001

(54) PAGED BASED MEMORY ADDRESS TRANSLATION TABLE UPDATE METHOD AND APPARATUS

(75) Inventors: Michael Frank, Newtown; Steven C. Dilliplane, Yardley, both of PA (US)

(73) Assignee: ATI International Srl, Christ Church (BB)

(*) Notice: Subject to any disclaimer, the term of this patent is extended or adjusted under 35 U.S.C. 154(b) by 0 days.

(21) Appl. No.: 09/310,564

(22) Filed: May 12, 1999

(51) Int. Cl.$^7$ .................................................. G06F 12/10
(52) U.S. Cl. ........................................................ 711/207
(58) Field of Search .................................. 711/166, 207, 711/167, 147

(56) References Cited

U.S. PATENT DOCUMENTS

| | | | |
|---|---|---|---|
| 4,733,348 | * | 3/1988 | Hiraoka et al. .................. 364/200 |
| 5,497,480 | * | 3/1996 | Hayes et al. .................... 395/493 |

* cited by examiner

*Primary Examiner*—Kevin L. Ellis
(74) *Attorney, Agent, or Firm*—Vedder, Price, Kaufman & Kammholz

(57) ABSTRACT

A page based memory address translation table update method and apparatus uses a first processor, such as a host processor or other processor, to notify a second processor to update its own page table. In one embodiment, the first processor generates an execution order driven page table maintenance command for the second processor. The second processor updates its own page table in sequence with received embedded commands. The second processor also updates its own translation look aside buffer in response to the page table maintenance data generated by the first processor. The page table maintenance data may be, for example, a page table maintenance command that is queued by the first processor so that the table update for the second processor is deferred from the first processors point of view since the second processor performs its own page table edits based on the order in which the page table maintenance command appears in a command queue for the second processor.

24 Claims, 4 Drawing Sheets

PAGED BASED MEMORY ADDRESS TRANSLATION TABLE UPDATE METHOD AND APPARATUS

FIELD OF THE INVENTION

The invention relates generally to virtual memory systems and more particularly to virtual memory systems employing page table structures.

BACKGROUND OF THE INVENTION

Many data processing systems, such as computers, employ memory access techniques that utilize virtual address space to physical address space mapping techniques. For example, personal computers and other data processing devices have a fixed amount of physical address space. This is typically considered the host processor's physical memory address space. As other processes, such as software applications and peripheral devices, including graphics processors, modems and other processes are used, the operating system typically provides fragmented, physically non-contiguous memory allocation for each given process. However, a process is given virtual address spaces that are contiguous address spaces. The host processor typically includes a mapping function to map virtual addresses space into physical address space. This defines a certain "view" of the memory subsystem as seen by the process(ors). As part of this operation, the operating system manages page tables for free memory. Each process, such as a software application, may get its own map of memory and hence its own page tables. Each page table entry may, for example, specify the mapping for a 4 kilobyte block of physical memory. Cooperating processes may share page tables and conflicting or competing processes may require exclusive use of unique page tables.

As such, multiprocess environments may use hierarchical page tables. Operating systems, for example, use hierarchical page tables as an indexing system. Typically two levels of tables are used. A first level includes a page table directory and a second level includes the page tables indexed in the page table directory. A host processor may subdivide the physical memory into four kilobyte logical pages and a memory management unit logically composes a 4 gigabyte contiguous linear address space from a sequence of physically non-adjacent pages. The page table directory holds a directory of pointers to all page tables for a particular process or application. Each page table may hold 1,024 entries of 32 bits each, for example. Each entry in the page table directory corresponds to a page table. Each page table, however, may correspond to 4 kilobytes*1024 of noncontiguous physical memory. However, since the page tables are indexed in a particular sequence, a processor or application sees the information as a contiguous memory space. As such, each entry in the page table directory points to one table and each entry in the page table points to one page. Pages being not necessarily contiguous in physical address space. Such systems typically require translation from virtual to physical address space for each page by using page table directories and/or page tables.

Many peripheral devices typically do not provide addressing space equal to that of the host processor or main processor. This can become problematic when newer versions of the peripheral device or software application are developed. A complete new addressing management scheme may typically have to be implemented to accommodate increased addressing space.

When such peripheral applications or devices, such as other non-host applications or non-operating system processes, use real time requests requiring data from memory in real time, the memory allocation technique must be fast enough and have a high enough bandwidth to accommodate real time requests. Real time requests may include, for example, real time video or audio requests from a display engine or audio engine.

Virtual memory based systems and page tables also typically utilize translation look aside buffers (TLB) which are typically dedicated to each process or processor in a multiprocessor system. These buffers are used to speed up access of data retrieval by avoiding redundantly looking up page table entries. Translation look aside buffers contain, for example, a directory entry and corresponding page table entries. However, these translation look aside buffers must also be suitably updated so that the proper virtual address is being retrieved at any given time.

With multiple processors maintaining a copy of a primary page table, it is difficult to keep page tables coherent for multiple processors since each have their own lookup buffers serving as cached versions of the page lookup tables. These translation look aside buffers can get out of synch with the actual page table when a page table is updated. For multiple processors sharing the same page table, both processors typically access the same physical address space so there needs to be synchronization to avoid conflicts. As a result, sophisticated synchronization techniques have to be used which require additional processing power and can slow down the system.

A major source of inefficiency results from one processor waiting for another processor to reach a synchronization point. Synchronization points guarantee that synchronized processes share the same view of memory at any point in time because they use equivalent page tables. The dynamic behavior of processes often results in changing views of memory requiring dynamic maintenance of page tables. Each process may progress at a different rate, leading to same views at different times or equivalent views at the same time.

In other systems, each processor may have its own page table stored but with multiple processors each require different versions of the page table at different times depending upon where in their particular process they are. For example, with a host processor and a graphics accelerator processor, a graphics accelerator typically does not need the full page table of the system to operate and only requires a subset thereof. However, the host processor typically updates the graphics controller page table only after the graphics controller has finished performing its operations relating to the current page table. The update of the host processor page table and the subset of the page table for the other processor, for example, is typically only done when the subsequent processor is idle. The host processor also will update its own translation look aside buffer, but typically does not update the translation look aside buffer of any other processor. Each processor typically has to update its own translation look aside buffer and also must wait until the host processor updates the main page table to avoid errors due to premature table updates.

Because one processing unit and another processing unit may process tasks at different speeds, and since the host processor is typically required to update all page tables, the host processor must wait until other processors have completed their tasks. This can be quite inefficient when the processors are performing functions for one another. For example, in a graphics accelerator system, the host processor may generate textures and store them within a new virtual memory space but the graphics controller may not have finished using the current page tables so the host processor has to wait for the graphics controller to become idle. Then, if the host processor knows that the other processor is idle, the host processor will then update the main page table and any page table for the graphics controller. A synchronization barrier slows down the system since the host processor can be idle with respect to the graphics controller and by doing so reducing concurrency between the processors.

A problem also exists with multiple processors using a common virtual memory space since the host processor or page table updater needs to notify the other processors immediately to have the other processors update their translation look aside buffers. The page table updater needs to wait until all processors are completed with their respective processes before the common page table can be updated. This also creates a synchronization barrier since some processors may be idle waiting for others to finish using the page table.

Consequently, there exists a need for an improved page table update method and apparatus to facilitate efficient page table updates among a plurality of processing units or processes.

DETAILED DESCRIPTION OF A PREFERRED EMBODIMENT OF THE INVENTION

Briefly, a page based memory address translation table update method and apparatus uses a first processor, such as a host processor or other processor, to notify a second processor to update its own page table. In one embodiment, the first processor generates an execution order driven page table maintenance command for the second processor. The second processor updates its own page table in sequence with received embedded commands. The second processor also updates its own translation look aside buffer in response to the page table maintenance data generated by the first processor. The page table maintenance data may be, for example, a page table maintenance command that is queued by the first processor so that the table update for the second processor is deferred from the first processor's point of view since the second processor performs its own page table edits based on the order in which the page table maintenance command appears in a command queue for the second processor. If desired, feedback to the first processor indicating that the page table has been updated may be generated by a second processor. Alternatively, the page table maintenance command may be stored in a ring command buffer, wherein the position of the command indicates to the first processor that the page table maintenance command was processed.

Figure 1:
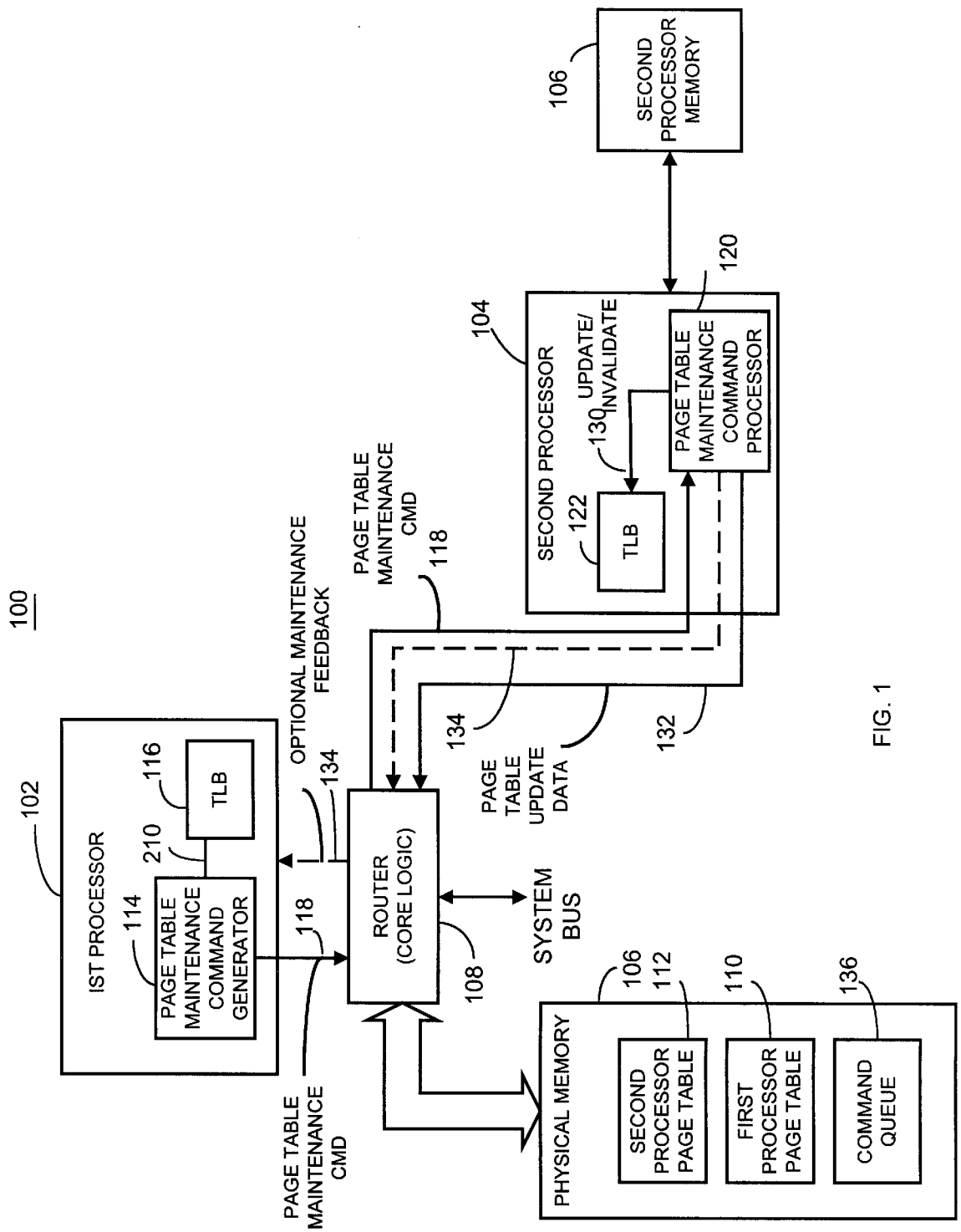
FIG. 1 is block diagram illustrating one example of a page based memory address translation table update apparatus in accordance with one embodiment of the invention.

FIG. 1 illustrates a multi processor system 100 that employs page based memory address translation table updates to facilitate virtual to physical memory mapping. The system 100 includes a first processor 102, such as a host processor, a second processor 104, such as a processor used to perform graphics acceleration processes, physical memory 106 accessible by the first and second processors 102, second processor memory 106 accessible by the second processor, and a command and data router 108. In this embodiment, the system 100 includes a first processor page table 110 associated with the first processor 102 and a second processor page table 112 associated with second processor 104 and a command queue 136 that is used to pass commands from the first processor 102 to a second processor 104. The page tables 110, 112 as known in the art include, for example, page table entries indexed by a corresponding page table directory entries. The system 100 may be any suitable system such as a multimedia computing system, hand held data processing system, telecommunication unit, video display or processing unit or any other suitable unit.

The first processor 102 includes a page table maintenance command generator 114 and a dedicated translation look up buffer 116. The page table maintenance command generator 114 generates page table maintenance data 118 such as a page table maintenance command for the second processor. The page table maintenance data 118 may be generated while the second processor 104 is using its associated second processor page table 112 (or a common page table if the system uses a common page table for the first and second processors). The router 108 may be any suitable routing circuit which routes the commands and/or data from a first processor to the second processor and vice versa. By way of illustration, the router 108 routes the page table maintenance data 118 to the second processor 104 and routes page table update data for the page tables 110 and 112.

The second processor 104, includes a page table maintenance command processor 120 and a dedicated translation look aside buffer 122. The second processor updates the page table 112 based on the page table maintenance data 118 after the second processor has completed using the entries in second processor page table 112. The second processor's page table 112 is related to the first processor page table 110 by containing either the entire page table 110 or a subset of the page table entries of the page table 110. The page table maintenance data 118 is placed, when it is in a form of a command understood by second processor 104, in a command queue, stored in a ring buffer. The first processor 102 places the page table maintenance command 118 in a suitable command execution order in the command queue 136 for the second processor in response to a change in first page table data by the first processor. In other words, the first processor waits until it updates its first processor page table 110 with new page table entries, generates the page table maintenance command and places the command in a command queue for the second processor in execution order so that the second processor does not update its second processor page table 112 until the page table maintenance command processor 120 reaches the page table maintenance command in the command queue 136. In this way, the second processor updates its own processor page table 112 so that the first processor need not wait until the second processor has completed its use of the first processor page table. In addition, the second processor 104 will only update its page table after it has completed using the page table entries in its page table 112. As such, the second processor updates the related second page table 112 in sequence with other received commands in the command queue such that the second related page table 112 is not updated in response to the page table maintenance command data 118 until other previous commands, if any, in the command queue 136 are processed. The maintenance command data 118 includes the new page table entry data for the second page table. In this way, the first processor provides the new page table entries required for the second processor to update its own page table and translation look aside buffer 122.

The page table maintenance command processor 120 evaluates the page table maintenance command 118 to determine what the new page table entries are, if any, and generates a translation look aside buffer update signal 130 so that the cached table entries are also updated when new page table entries have been applied by the second processor.

The second processor generates page table update data 132 in response to analyzing the page table maintenance data 118. The page table update data 132 may include the new page table entries sent as part of the page table maintenance command for storage in the second processor page table 112. The second processor 104 therefore updates the related page table 112 by editing portions of the page table such as by replacing all entries in the related second page table in response to the page table maintenance data, or replacing some page table entries in the second processor page table 112. The entries and their contents that need to be updated are included as part of the page table maintenance command.

Since the page table maintenance command is stored as part of regular commands sent from the first processor to the second processor and stored in a ring buffer by the first processor, the first processor can determine whether the second processor has updated its page table by determining where the page table maintenance command appears in the ring buffer. Alternatively, the page table maintenance command processor 120 can generate maintenance feedback data 134 to the first processor after the page table update data has been stored in the second processor page table 112.

Figure 2:
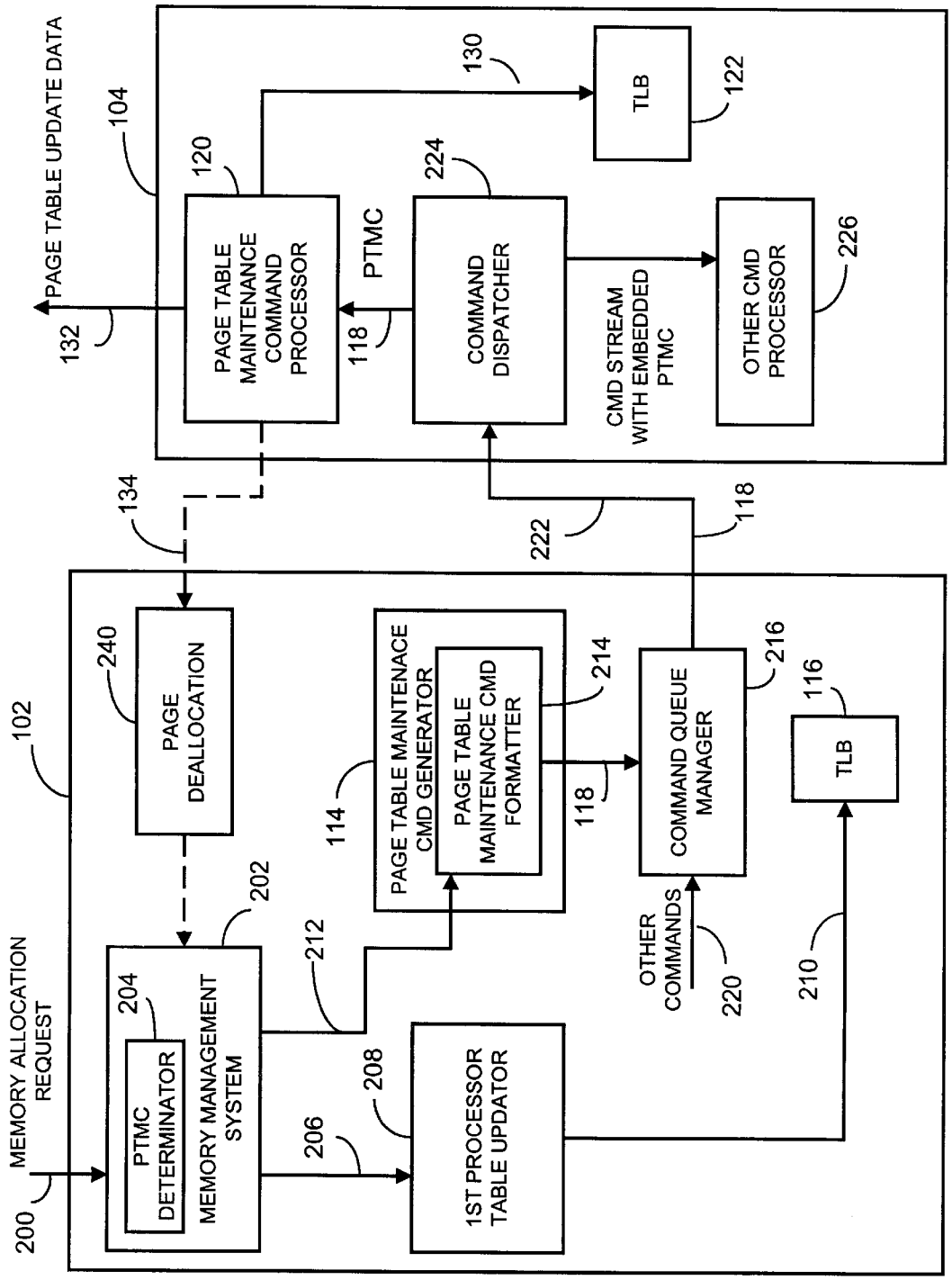
FIG. 2 is a block diagram illustrating in more detail an example of one embodiment of a page based memory address translation table update apparatus in accordance with the invention.

FIG. 2 illustrates in more detail the first and second processors 102 and 104. As shown, the first processor 102 receives a memory allocation. request 200 from one or more software applications, other processors, or any other entity requiring memory allocation. The first processor includes a memory management system 202 that receives the memory allocation request 200 to determine whether virtual or physical memory is to be used. The memory management system 202 includes a page table maintenance command determinator 204 which may be any suitable software module, for example, that determines whether the page table for the second processor needs to be updated. For example, if the second processor is idle, there is no need to generate a page table maintenance command but the first processor 102 can directly access the page table 112 and update its contents. In addition, if the memory allocation request 200 does not affect the subset of page table entries in use by the second processor, no page table maintenance command needs to be generated. A page table maintenance command needs to be generated if the memory management system 202, executing on a first processor 102, allocates or deallocates memory pages used by a second processor 104 while this processor 104 is executing instructions that may reference any of these pages. The memory management system 202 determines whether the first processor page table 110 needs to be updated using any suitable technique as known in the art. An update command 206 is generated by the memory management system to a first processor table updater 208 to have the first processor table updater generate update information 210 to the translation look up buffer 116. The first processor table updater also then updates the first processor page table 110 using any suitable technique as known in the art.

If the memory management system 202 determines that a page table maintenance command should be generated, the page table maintenance command generator 114 is activated through control data 212. The page table maintenance command (PTMC) generator 114 includes a page table maintenance command formatter 214 which formats the PTMC including the new page table entries that need to be added to the second processor page table 112 in a suitable format understood by the command queue manager 216. The page table maintenance command formatter 214 may be any suitable software, for example, that places the new page table entries for the second processor page table 112 in a suitable format recognized by the command queue manager 216.

The command queue manager 216 receives other commands for the second processor 220 along with the page table maintenance command 118 and puts the commands in a suitable queue for processing by the second processor. These commands are communicated over a suitable bus 222. Bus 222 passes the page table maintenance command 118.

The second processor 104 also includes a command dispatcher 224 as well as another command processor 226. The command dispatcher 224 dispatches the requested commands to the appropriate subprocessors within processor 104. For example, the command dispatcher 224, upon recognizing a page table maintenance command, dispatches the page table maintenance command 118 to the page table maintenance command processor 120 so that the page table update data 132 can be used to update the second processor page table 112. Also, the command dispatcher 224 routes the other commands in the command stream 136 to the other command processor 226. The command dispatcher 224 sequentially dispatches the commands from the command queue manager in the order in which the commands were received so that the page table maintenance command is not processed until previous commands in a queue prior to the page table maintenance command have been processed. In this way, the second processor will update its page table only after it is finished using the entries in the page table (and its TLB) although the first processor page table 110 may already be updated.

Figure 3:
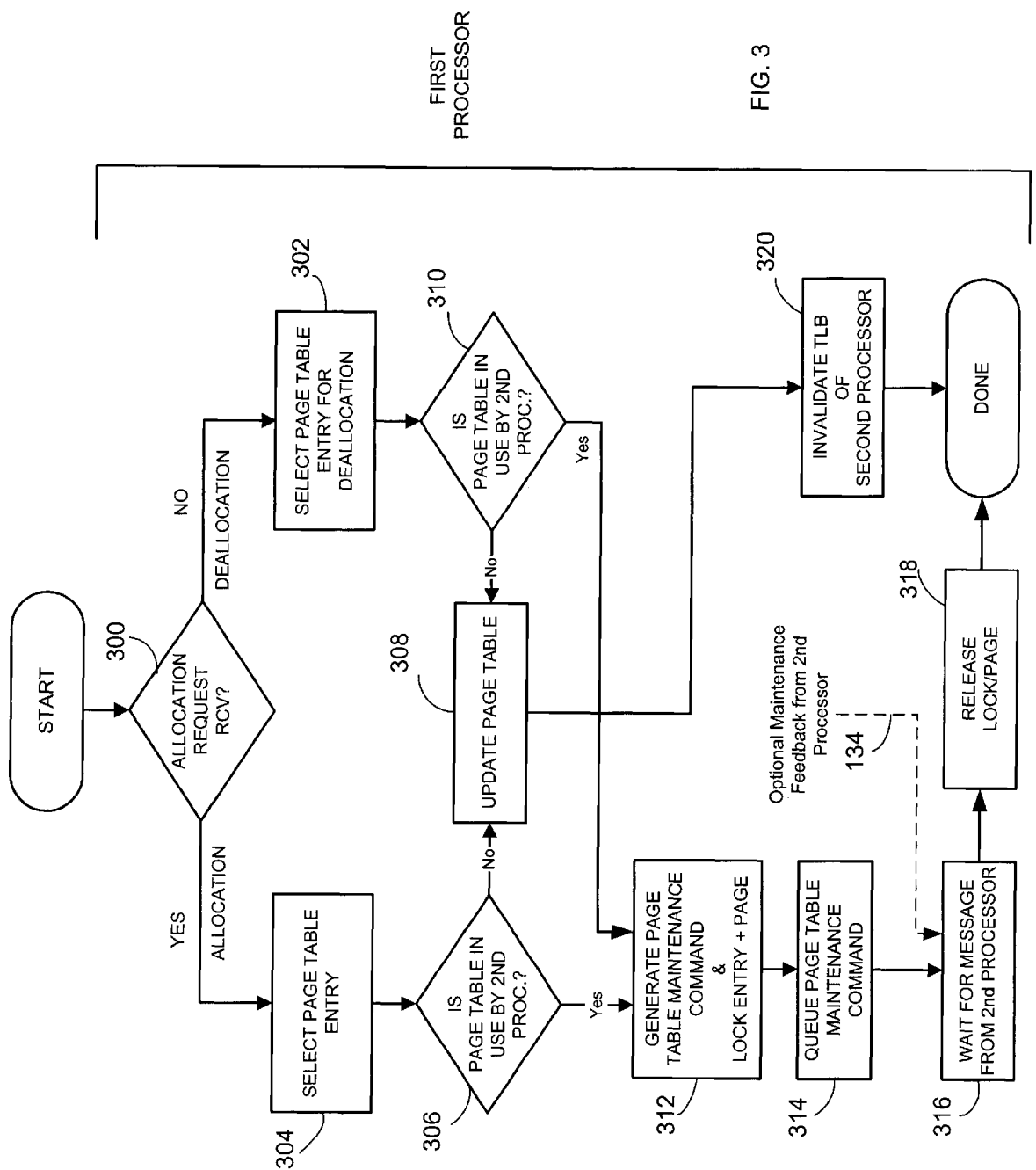
FIG. 3 is a flow chart illustrating one example of a page based memory address translation table update method in accordance with one embodiment of the invention.

FIG. 3 illustrates an example of a method for updating page tables as seen by the first processor. As shown in block 300, the first processor determines whether a memory allocation request has been received. If no memory allocation request has been received, the processor may then provide memory deallocation in the form of releasing pages as shown in block 302. A page deallocater 240 may perform this function 318 based upon the feedback data 134 from the second processor indicating that it has completed its page table update. As shown in block 304, if a memory allocation request has been received, the first processor selects the page table entry corresponding to the virtual memory allocated for this memory allocation request. The first processor determines if the page table that has been selected is being used by the second processor as shown in block 306. If it is not being used by the second processor, the first processor updates its page table 110 as shown in block 308 and invalidates the page table entries in the translation look aside buffer 116 as shown in block 320. The first processor then waits for another memory allocation request.

However, if the selected page table entry is included in the second processor page table being used by the second processor, the first processer generates a page table maintenance command as shown in block 312, locks the entry for any other process and queues the page table maintenance command as shown in block 314 with other commands for the second processor. If a feedback path from the $2^{nd}$ processor has been provided the first processor then needs to wait 316 for the completion message 134 signaling that the page table update has been completed before it may proceed and release the locked entry 318.

Figure 4:
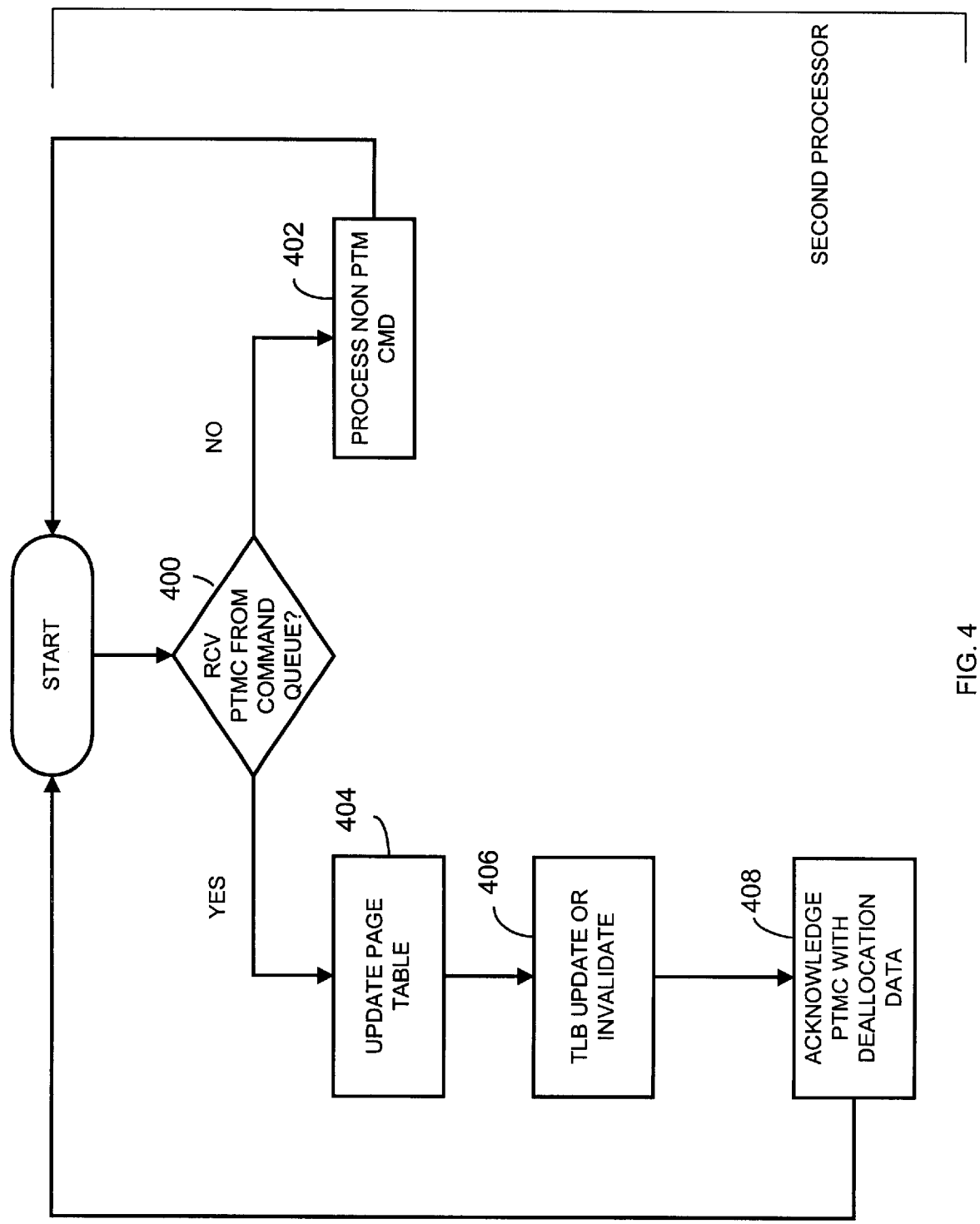
FIG. 4 is a flow chart illustrating one example of a page based memory address translation table update method in accordance with one embodiment of the invention.

FIG. 4 illustrates a method for updating page tables in accordance with one embodiment of the invention as seen from the perspective of the second processor. As shown in block 400, a second processor determines whether it has received a page table maintenance command from the command queue through command dispatcher 224. If no page table maintenance command has been received, the processor continues to process commands through its other command processor. This is shown in block 402. As shown in block 404, if the second processor has received a page table maintenance command it then updates the second processor page table using the new page table data in the command. The second processor also updates its own translation look aside buffer with the new page table entries as embedded in the page table command as shown in block 406 or invalidates the translation look aside buffer entries to avoid using stale (outdated) translation data. As shown in block 408, the second processor acknowledges the page table maintenance command with deallocation data 134 which is fed back to the first processor so that the first processor can then deallocate the page table entries that were previously stored in the second page table 112.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A page based memory address translation table update method for a system having a first page table associated with a first processor and a second processor, the method comprising steps including:
   generating page table maintenance data by the first processor for the second processor while the second processor, is using the first page table; and
   updating, by the second processor, the first page table based on the page table maintenance data after the second processor has completed use of the first page table.

2. The method of claim 1 including the step of:
   placing page table maintenance command data in a suitable command execution order in a command queue for the second processor in response to a change in first page table data by the first processor; and wherein the step of updating includes,
   updating the first page table, by the second processor, in sequence with other received commands in the command queue such that the first page table is not updated in response to the page table maintenance command data until other previous commands, if any, in the command queue are processed.

3. The method of claim 1 wherein the step of updating by the second processor includes at least one of editing portions of the page table and replacing all entries in the page table in response to the page table maintenance data.

4. The method of claim 2 wherein the command queue is a ring buffer.

5. The method of claim 2 wherein the step of placing the page table maintenance command data in a suitable command queue includes providing new page table entry data for the first page table as part of the page table maintenance command.

6. The method of claim 1 including
   invalidating, by the first processor, a first page table lookup buffer of the first processor when the second processor is not using the first page table; and
   updating, by the second processor, a second page table lookup buffer of the second processor in response to processing the page table maintenance data.

7. A page based memory address translation table update method for a system having a first page table associated with a first processor and a related second page table associated with a second processor, the method comprising steps including:
   generating page table maintenance data by the first processor for the second processor while the second processor is using the related second page table; and
   updating, by the second processor, the related second page table based on the page table maintenance data after the second processor has completed use of the related second page table.

8. The method of claim 7 including the step of:
   placing page table maintenance command data in a suitable command execution order in a command queue for the second processor in response to a change in first page table data by the first processor while the second processor is using the related second page table; and wherein the step of updating includes,
   updating the related second page table, by the second processor, in sequence with other received commands in the command queue such that the second related page table is not updated in response to the page table maintenance command data until other previous commands, if any, in the command queue are processed.

9. The method of claim 8 wherein the step of updating by the second processor includes at least one of editing portions of the related page table and replacing all entries in the related second page table in response to the page table maintenance data.

10. The method of claim 8 wherein the command queue is a ring buffer.

11. The method of claim 8 wherein the step of placing the page table maintenance command data in a suitable command queue includes providing new page table entry data for the related second page table as part of the page table maintenance command.

12. The method of claim 8 including
   invalidating, by the first processor, a first pace table lookup buffer of the first processor when the second processor is not using the first page table; and
   updating, by the second processor, a second page table lookup buffer of the second processor in response to processing the page table maintenance data.

13. A page based memory address translation table update apparatus for a system having a first page table associated with a first processor and a second processor, the apparatus comprising:
   first processor means for generating page table maintenance data for the second processor while the second processor is using the first page table; and second processor means for updating the first page table based on the page table maintenance data after the second processor has completed use of the first page table.

14. The apparatus of claim 13 wherein the first processor means places page table maintenance command data in a suitable command execution order in a command queue for the second processor means in response to a change in first page table data by the first processor means; and wherein the second processor means updates the first page table in a sequence represented by the order of other received commands in the command queue such that the first page table is not updated in response to the page table maintenance command data until other previous commands, if any, in the command queue are processed.

15. The apparatus of claim 13 wherein the second processor updates the page table by at least one of editing portions of the page table and replacing all entries in the page table in response to the page table maintenance data.

16. The apparatus of claim 14 including a ring buffer that stores the command queue.

17. The apparatus of claim 14 wherein the first processor means provides new page table entry data for the first page table as part of the page table maintenance command.

18. The apparatus of claim 13 including
means for invalidating a first page table lookup buffer of the first processor when the second processor is not using the first page table; and
means for updating a second page table lookup buffer of the second processor in response to processing the page table maintenance data.

19. A page based memory address translation table update apparatus for a system having a first page table associated with a first processor and a related second page table associated with a second processor, the apparatus comprising:

first processor means for generating page table maintenance data for the second processor while the second processor is using the related second page table; and
second processor means for updating the related second page table based on the page table maintenance data after the second processor has completed use of the related second page table.

20. The apparatus of claim 19 wherein the first processor means places page table maintenance command data in a suitable command execution order in a command queue for the second processor means in response to a change in first page table data by the first processor means; and wherein the second processor means updates the second page table in a sequence represented by the order of other received commands in the command queue such that the second page table is not updated in response to the page table maintenance command data until other previous commands, if any, in the command queue are processed.

21. The apparatus of claim 20 wherein the second processor updates the page table by at least one of editing portions of the page table and replacing all entries in the page table in response to the page table maintenance data.

22. The apparatus of claim 20 including a ring buffer containing the command queue.

23. The apparatus of claim 20 wherein the first processor means provides new page table entry data for the related second page table as part of the page table maintenance command.

24. The apparatus of claim 20 including
means for invalidating a first page table lookup buffer of the first processor when the second processor is not using the first page table; and
means for updating a second page table lookup buffer of the second processor in response to processing the page table maintenance data.

* * * * *